United States Patent [19]

Ampferer et al.

[11] Patent Number: 5,094,072

[45] Date of Patent: Mar. 10, 1992

[54] EXHAUST SYSTEM OF A RECIPROCATING PISTON ENGINE

[75] Inventors: Herbert Ampferer, Sachsenheim; Klaus Schneider, Tiefenbronn-Mühlhausen, both of Fed. Rep. of Germany

[73] Assignee: Dr. Ing. h.c.F. Porsche AG, Fed. Rep. of Germany

[21] Appl. No.: 552,618

[22] Filed: Jul. 16, 1990

[30] Foreign Application Priority Data

Jul. 15, 1989 [DE] Fed. Rep. of Germany ....... 3923517

[51] Int. Cl.⁵ ............................ F01N 3/22; F01N 3/28
[52] U.S. Cl. ........................................ 60/290; 60/301; 422/171; 422/180
[58] Field of Search ................. 60/299, 301; 422/171, 422/180

[56] References Cited

U.S. PATENT DOCUMENTS

| | | |
|---|---|---|
| 3,906,723 | 9/1975 | Matumoto et al. . |
| 3,972,687 | 8/1976 | Frietzsche . |
| 4,049,388 | 9/1977 | Scheitlin ............... 422/171 |
| 4,191,013 | 3/1980 | Katahira et al. . |
| 4,231,220 | 11/1980 | Takeda . |
| 4,235,843 | 11/1980 | Tadokoro et al. . |
| 4,235,846 | 11/1980 | Abthoff ................... 422/171 |
| 4,394,331 | 7/1983 | Gast . |
| 4,425,304 | 1/1984 | Kawata .................. 422/171 |

FOREIGN PATENT DOCUMENTS

| | | |
|---|---|---|
| 0177479 | 8/1985 | European Pat. Off. . |
| 2401287 | 7/1974 | Fed. Rep. of Germany . |
| EP8901134 | 4/1990 | PCT Int'l Appl. . |
| 1406704 | 9/1975 | United Kingdom . |

*Primary Examiner*—Douglas Hart
*Attorney, Agent, or Firm*—Evenson, Wands, Edwards, Lenahan & McKeown

[57] ABSTRACT

A metal support catalyst is inserted into the exhaust pipe of a reciprocating piston engine. The catalyst comprises two monoliths spaced away from one another and surrounded by jacket tubes which are centered coaxially with respect to one another with a sliding fit in beads and crimpings of the outer jacket. At an air feeding point between the beads of the outer jacket, air is introduced between the two monoliths in the lower rotational speed range of the engine in order to achieve an afterreaction of the exhaust gases.

19 Claims, 2 Drawing Sheets

EXHAUST SYSTEM OF A RECIPROCATING PISTON ENGINE

BACKGROUND AND SUMMARY OF THE INVENTION

The invention relates to an exhaust system of a multi-cylinder reciprocating piston engine of the general type is described in the German Patent Document DE-OS 24 01 287. In order to avoid an overheating of the catalyst, air is blown into its outer jacket above a certain exhaust gas temperature. The air, which originates from a compressed-air source, by way of a change-over valve, on one side, flows into the outer jacket of the catalyst, flows along the outside of the catalyst monolith and, behind the monolith, mixes with the exhaust gas flowing out of it. In this manner, the oxidation of the exhaust gas is promoted. The introduction of air on one catalyst side may have the result that the catalyst bends as a result of a "cold-temperature shock" and becomes inoperative.

It is an object of the invention to develop an exhaust system of this type such that the catalyst suffers no damage as a result of the introduction of the air and an effective afterreaction of the exhaust gases is achieved.

This object is achieved according to the invention by providing an exhaust system for a reciprocating piston engine, comprising;
an exhaust pipe,
catalyst mean inserted in the exhaust pipe,
and air feeding line means for feeding outside air to the catalyst mean for facilitating afterreaction of exhaust gases flowing through the catalyst means,
wherein the catalyst means include two separate monoliths enclosed by a common outer jacket,
and wherein the air feeding line means is disposed to have an air feeding point in between the two separate monoliths.

If the air feeding point is situated approximately in the center between two separately manufactured monoliths which are enclosed by an outer jacket of the catalyst, the air can flow into the catalyst without subjecting it to the risk of damage as a result of an excessive cooling. By means of the additional constructive measures disclosed in the illustrated preferred embodiment, this risk is reduced to the extent that the operating reliability of the catalyst is ensured in all possible operating conditions of the engine and at the same time, a reasonable manufacturing of the catalyst is ensured.

Other objects, advantages and novel features of the present invention will become apparent from the following detailed description of the invention when considered in conjunction with the accompanying drawings.

DETAILED DESCRIPTION OF THE DRAWING

Figure 1:
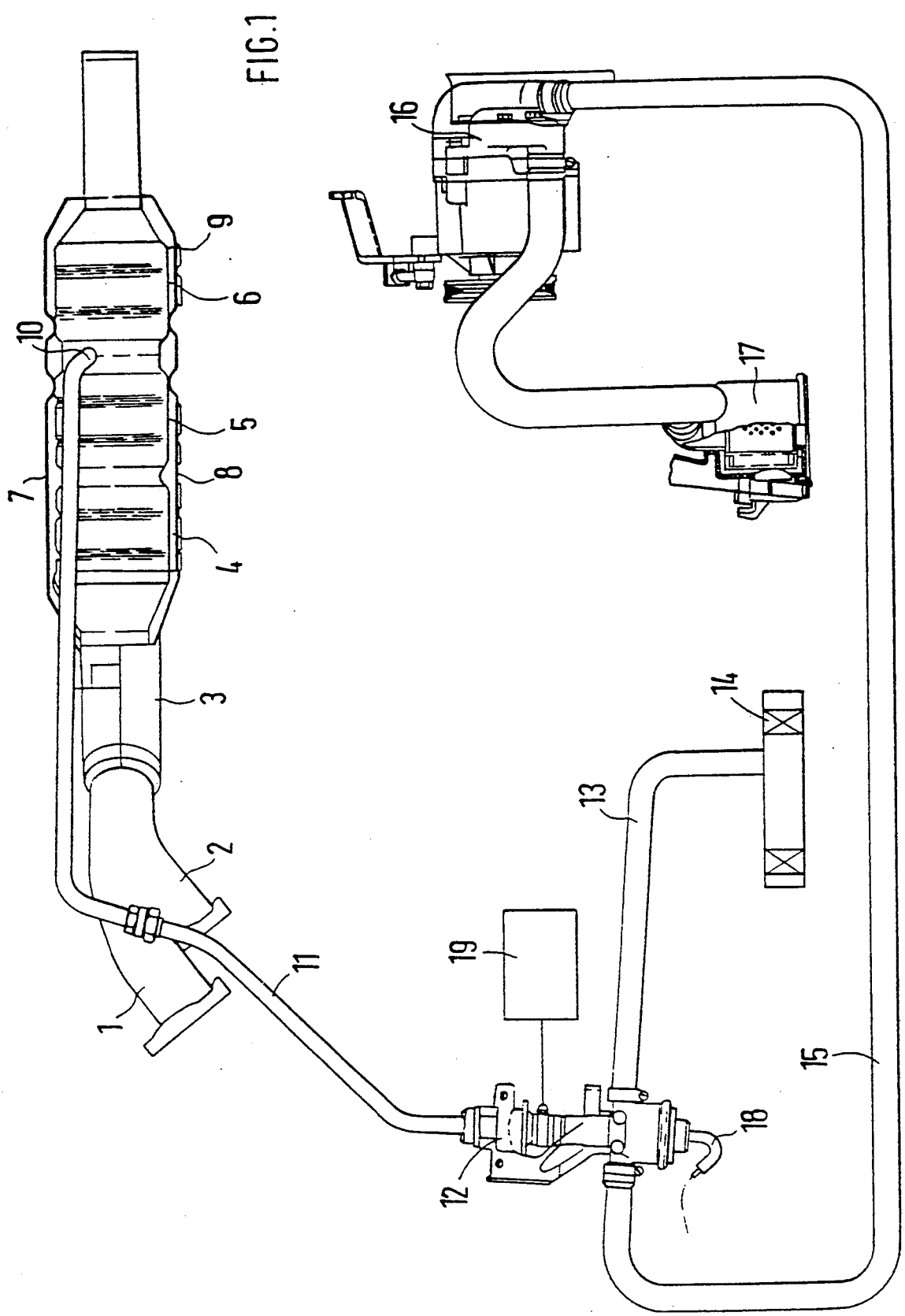
FIG. 1 is a schematic view of a reciprocating piston engine with an exhaust system and a catalyst, constructed in accordance with a preferred embodiment of the invention.
Figure 2:
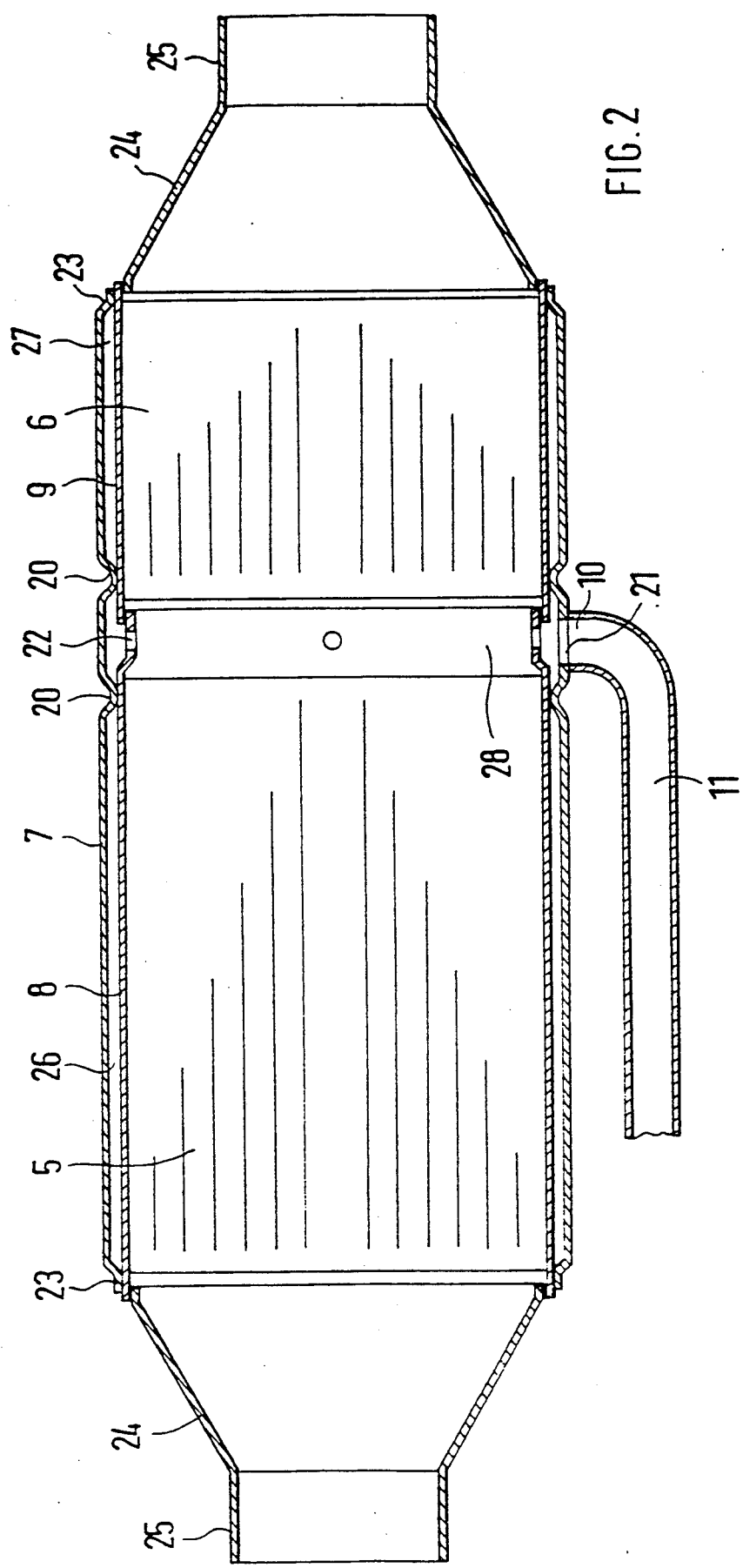
FIG. 2 is an enlarged longitudinal sectional view of the catalyst of FIG. 1.

The two exhaust lines 1 and 2 of a reciprocating piston engine, which is not shown in the drawing, are connected to a common exhaust pipe 3 into which a catalyst 4 is inserted in order to purify the exhaust gas. The catalyst 4 comprises two metal support monoliths 5 and 6 which are arranged to be disposed coaxially at a distance from one another and are enclosed by a common outer jacket 7. The monoliths 5 and 6 are surrounded by jacket tubes 8 and 9, at the ends of which, which are centered in one another, an air feeding point to the catalyst 4 is disposed. By means of an air pipe 11, the air feeding point 10 is supplied with air by way of an electro-pneumatic change-over valve 12. From the change-over valve 12, a second air pipe 13 leads to the air filter 14 of the reciprocating piston engine; a third air pipe 15 leads to an air pump 16 driven by an electric motor which takes in ambient air by way of an air filter 17. A control air pipe 18 leads from the change-over valve 12 to the intake pipe of the reciprocating piston engine. The change over valve 12 is constructed as a timing valve, reacts to signals of the motronic system 19 of the reciprocating piston engine and is actuated by the vacuum of the engine intake pipe fed by way of the control air pipe 18. In the lower rotational speed range of the engine, at throttle valve angles of from 0° to approximately 7°, the change-over valve opens up the path to the first air pipe 11 so that, at the air feeding point 10, additional air arrives in the catalyst 4. At higher throttle valve angles and rotational engine speeds, the change-over valve closes air pipe 11 and opens up air pipe 13 to the air filter of the reciprocating piston engine.

The air feeding point 10 to the catalyst 4 is situated between two beads 20 of the outer jacket 7 which point radially toward the inside. It is formed by a radial bore 21 in the outer jacket 7, a ring duct 21' and several radial bores 22 of the longer jacket tube 8 which is centered in the shorter jacket tube 9 with a sliding fit. The two outer ends of the jacket tubes 8 and 9, by means of a sliding fit, are centered in radial crimpings 23 of the outer jacket 7. In the case of temperature-caused length changes, the two jacket tubes 8 and 9 can expand freely with respect to one another as well as with respect to the outer jacket 7.

The jacket tubes are composed of cylindrical tube sections, of connecting conically tapering tube sections and of end-face cylindrical tube pieces 25. Since the jacket tubes 8, 9, in a sealed manner, are centered in beads 20 and crimpings 23 of the outer jacket 7, heat-insulating air gaps 26, 27 are formed between the jacket tubes 8, 9 and the outer jacket 7. The sealed-off beads prevent hot exhaust gases from penetrating into the air gaps 26, 27 and from being able to eliminate the desired insulating effect.

By way of the air feeding point 10, air arrives in the space 28 between the two monoliths 5 and 6 in the lower rotational speed range of the engine. By means of this air, a reduction or oxidation of the exhaust gases is reached as an afterreaction mainly in the shorter monolith 6 which, because of its flow and position, is slightly cooler than the longer monolith. Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. An exhaust system for a reciprocating piston engine, comprising:
an exhaust pipe,
catalyst means inserted in the exhaust pipe, and air feeding line means for feeding outside air to the catalyst means for facilitating after reaction of exhaust gases flowing through the catalyst means, wherein the catalyst means include two separate monoliths enclosed by a common outer jacket, wherein both of the monoliths are enclosed by respective jacket tubes which are slidably disposed with respect to the outer jacket to accommodate thermal expansions during use, and wherein the air feeding line means is disposed to have an air feeding point in between the two separate monoliths.

2. An exhaust system according to claim 1, comprising change over valve means for controlling supply of air to the air feeding line means as a function of engine operating conditions.

3. An exhaust system according to claim 1, wherein the air feeding point is formed by radial openings of the outer jacket and of one of the jacket tubes through which air is introduced into the space between the monoliths.

4. An exhaust system according to claim 3, wherein the outer jacket has beads curved on both sides toward the inside to the air feeding point in which the inner ends of the jacket tubes which are adjacent to one another are centered with a sliding fit in a sealed manner.

5. An exhaust system according to claim 4, wherein the two outer ends of the jacket tubes are held with a sliding fit in radial crimpings of the outer jacket in such a manner that heat-insulating air gaps with still air are formed between the jacket tubes and the outer jacket.

6. An exhaust system according to claim 4, wherein the jacket tubes are of different length, and wherein the inner end of the one longer jacket tube is centered by means of a sliding fit in the inner end of the other shorter jacket tube.

7. An exhaust system according to claim 5, wherein the jacket tubes are of different length, and wherein the inner end of the one longer jacket tube is centered by means of a sliding fit in the inner end of the other shorter jacket tube.

8. An exhaust system according to claim 3, wherein the two jacket tubes are each composed of prismatic tube sections extending inside the outer jacket, connecting conically tapering tube sections, and cylindrical tube pieces integrally connected with said tube sections.

9. An exhaust system according to claim 4, wherein the two jacket tubes are each composed of prismatic tube sections extending inside the outer jacket, connecting conically tapering tube sections, and cylindrical tube pieces integrally connected with said tube sections.

10. An exhaust system according to claim 5, wherein the two jacket tubes are each composed of prismatic tube sections extending inside the outer jacket, connecting conically tapering tube sections, and cylindrical tube pieces integrally connected with said tube sections.

11. An exhaust system according to claim 6, wherein, the two jacket tubes are each composed of prismatic tube sections extending inside the outer jacket, connecting conically tapering tube sections, and cylindrical tube pieces integrally connected with said tube sections.

12. An exhaust system according to claim 1, wherein a metal support catalyst is used as the catalyst means.

13. An exhaust system according to claim 2, wherein said change over valve mean includes means for introducing feeding air during lower rotational speed ranges of the invention.

14. An exhaust system for reciprocating piston engine, comprising:
an exhaust pipe,
catalyst means inserted int the exhaust pipe,
and air feeding line means for feeding outside air to the catalyst means for facilitating after reaction of exhaust gases flowing through the catalyst means,
wherein the catalyst means include two separate monoliths enclosed by a common outer jacket,
wherein the two monoliths are mounted inside said outer jacket so as to have respective ends of the monoliths slidably movable with respect to the outer jacket to accommodate thermal expansion during use,
and wherein the air feeding line means is disposed to have an air feeding point in between the two separate monoliths.

15. An exhaust system according to claim 14, wherein the monoliths are each enclosed by a respective jacket tube, oppositely facing ends of said jacket tubes being fixed to the common outer jacket, and facing ends of said tubes being slidably telescopically connected with one another.

16. An exhaust system for a reciprocating piston engine, comprising:
an exhaust pipe,
catalyst means inserted in the exhaust pipe,
and air feeding line means for feeding outside air to the catalyst means for facilitating after reaction of exhaust gases flowing through the catalyst means,
wherein the catalyst means include two separate monoliths enclosed by a common outer jacket,
wherein the air feeding line means is disposed to have an air feeding point in between the two separate monoliths,
wherein the air feeding point is formed by radial openings of the outer jacket and of one of the jacket tubes through which air is introduced into the space between the monoliths, and
wherein the outer jacket has beads curved on both sides toward the inside to the air feeding point in which the inner ends of the jacket tubes which are adjacent to one another are centered with a sliding fit in a sealed manner.

17. An exhaust system according to claim 16, wherein the two outer ends of the jacket tubes are held with a sliding fit in radial crimpings of the outer jacket in such a manner that heat-insulating air gaps with still air are formed between the jacket tubes and the outer jacket.

18. An exhaust system according to claim 16, wherein the jacket tubes are of different length, and wherein the inner end of the one longer jacket tube is centered by means of a sliding fit in the inner end of the other shorter jacket tube.

19. an exhaust system according to claim 17, wherein the jacket tubes are of different length, and wherein the inner end of the one longer jacket tube is centered by means of a sliding fit in the inner end of the other shorter jacket tube.

* * * * *